(Model.)

W. NERACHER.
Point Band for Hubs.

No. 237,441. Patented Feb. 8, 1881.

Witnesses:

William Neracher, Inventor,

By Geo. C. Tracy & Co.,
Attorneys.

UNITED STATES PATENT OFFICE.

WILLIAM NERACHER, OF CLEVELAND, OHIO.

POINT-BAND FOR HUBS.

SPECIFICATION forming part of Letters Patent No. 237,441, dated February 8, 1881.

Application filed November 29, 1880. (Model.)

*To all whom it may concern:*

Be it known that I, WILLIAM NERACHER, of Cleveland, in the county of Cuyahoga and State of Ohio, have invented a new and useful Improvement in Inclosed Bands for Wheel-Hubs; and I do hereby declare that the following is a full and exact description of the same, reference being had to the accompanying drawings, and to the letters of reference marked thereon.

My invention relates to certain improvements in the construction and arrangement of movable covers or caps designed to be inserted in the end of the band or sleeve which encircles the outer end of the hub of a carriage or wagon wheel, thus forming a box which prevents the admission of dust, dirt, and other substances into the hub, and also the escape of the lubricating material, which would soil or injure the adjacent parts of the vehicle, or the clothing of persons when getting into or out of the same.

Figure 2:
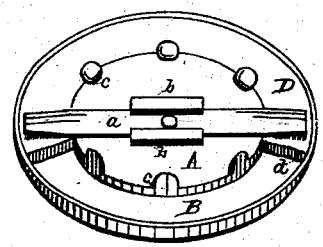
Figure 3:
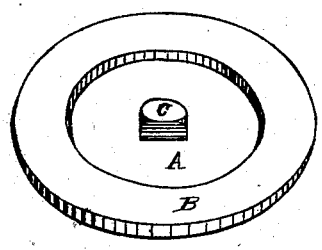
Figure 1:
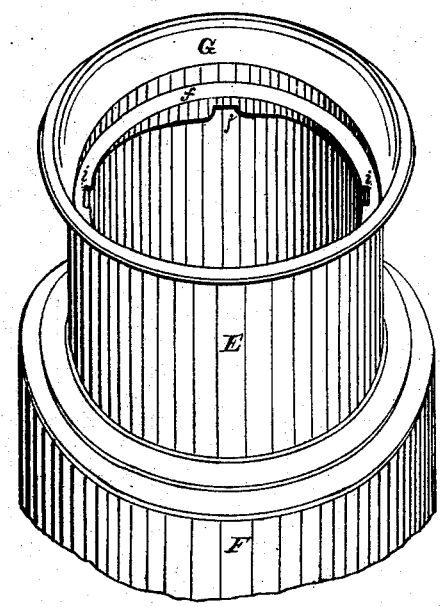

In the drawings, Figure 1 is a perspective view of the end of a wheel-hub, showing my improved construction of the band, and Figs. 2 and 3 are lower and upper views, respectively, of the cap or cover, which is inserted in the outer end of the band for the purpose of excluding dust, dirt, &c., and preventing the lubricant used from flowing out.

In Fig. 1, E is the band, of the ordinary shape, inclosing the end of the hub F and acting as a ferrule to protect the wood from strain and breakage. G is a rim around said band, and $f$ a shoulder within the rim, with notches $i\ i$, and beveled back or under side, with recess or notch, as shown at $j$.

In Fig. 2, A is a raised plane surface of the cover or cap, which fits within the hub and locks therein. B is a depressed or grooved ring around the outer circumference of the inner surface of this cover, designed to receive the washer D, which may be of any suitable elastic material, and is shown broken away at $d$ to indicate the manner in which it is applied. $a$ is a spring having curved and upturned edges to allow of its being readily slipped into the notches $i\ i$, and by a semi-revolution of the cover is made to engage in the notch $j$, and a corresponding notch upon the opposite side of the rim $f$, thus holding the cover firmly down upon the rim, and preventing any dust, dirt, &c., from entering, and any grease or oil from running out. The spring is held in place by lugs $b\ b$. $c\ c$ are also lugs cast upon the cover in an upright position, and designed to be bent over, as shown at $c$, for the purpose of holding the washer in place.

Fig. 3 is an outer view of the cap, in which A is the depressed portion corresponding to the plane surface upon the opposite side; B, the rim, wherein is contained the washer, and C a nut, upon which a wrench is used to turn the cover when it is desired to remove or replace it. The cover may be turned either to the right or left to disengage it from the rim or replace it within the same.

Having thus described my invention, what I claim as new, and desire to secure by Letters Patent, is—

In a wheel-hub, the band E, having beveled flange $f$, provided with notches $i$, in combination with the dust-cap, provided with spring $a$ on its inside, nut C on its outside, and washer D, constructed and arranged substantially as described and shown.

This specification signed and witnessed this 3d day of March, 1879.

WILLIAM NERACHER.

Witnesses:
 GEO. E. TRACY,
 J. F. CAMPBELL.